(12) United States Patent
Klausmann et al.

(10) Patent No.: US 7,326,935 B2
(45) Date of Patent: Feb. 5, 2008

(54) PLANAR IMAGE DETECTOR

(75) Inventors: Hagen Klausmann, Germering (DE); Georg Wittmann, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/611,176

(22) Filed: Dec. 15, 2006

(65) Prior Publication Data

US 2007/0145284 A1    Jun. 28, 2007

(30) Foreign Application Priority Data

Dec. 16, 2005   (DE)   ................ 10 2005 060 795

(51) Int. Cl.
*G01T 1/20* (2006.01)
*G01T 1/24* (2006.01)

(52) U.S. Cl. ............... 250/370.11; 250/370.09

(58) Field of Classification Search ...................
250/370.01–370.15, 378, 363.01–363.1,
250/318, 208.1–208.6; 257/107, 153, 157,
257/175, 176, 202, 239, 250, 260, 267, 282,
257/285, 300, 331, 346; 378/98, 98.2–98.12
See application file for complete search history.

(56) References Cited

U.S. PATENT DOCUMENTS 5,498,880 A * 3/1996 Lee et al. .................. 250/580
5,729,021 A * 3/1998 Brauers et al. ......... 250/370.09
5,859,463 A * 1/1999 Liu et al. .................... 257/448
6,037,609 A * 3/2000 Liu et al. ...................... 257/59
6,348,693 B1 * 2/2002 Weisfield et al. ....... 250/370.11
6,665,374 B2 * 12/2003 Izumi et al. .................. 379/40
7,115,878 B2 * 10/2006 Ikeda et al. ............ 250/370.09
2001/0008271 A1 * 7/2001 Ikeda et al. ............ 250/370.09
2003/0038306 A1 * 2/2003 Izumi et al. ................. 257/222
2005/0161754 A1   7/2005 Izumi
2006/0063351 A1 * 3/2006 Jain ............................ 438/455
2007/0085112 A1 * 4/2007 Yamazaki et al. ........... 257/288

FOREIGN PATENT DOCUMENTS

EP         1 612 581        6/1998
WO    WO 03/073507        9/2003

\* cited by examiner

*Primary Examiner*—Kiesha L. Rose
*Assistant Examiner*—Kiho Kim
(74) *Attorney, Agent, or Firm*—Schiff Hardin LLP

(57) ABSTRACT

A planar image detector with a number of photosensor elements arranged like a matrix, the photosensor elements being activated by at least one associated switching element and respectively exhibiting at least one memory element with a predetermined capacity. A predetermined number of phototransistors each have a gate electrode that exhibits at least one gap in a gate metallization thereof and arranged between the source electrode and the drain electrode. The gap produces a space that is reduced in terms of field strength that can be realized simply in terms of production of such planar image detector.

20 Claims, 2 Drawing Sheets

PLANAR IMAGE DETECTOR

BACKGROUND OF THE INVENTION

1. Field of the Invention

The invention concerns a planar detector for detecting a radiation image.

2. Description of the Prior Art

A planar image detector with a sensor field composed of phototransistors arranged in a matrix is known from WO 03/073507 A2. The phototransistors are fashioned as thin film transistors (TFT) and can be individually activated by at least one associated switching element. Each thin film transistor has at least one storage element with a predetermined capacity, the memory element being arranged next to the thin film transistor. Due to its design, the planar image detector known from WO 03/073507 A2 necessitates a large total space requirement in order to achieve a predetermined active detector surface, or the active detector surface is correspondingly small given a predetermined total surface requirement. The known planar image detector thus exhibits a relatively disadvantageous ratio of active detector surface to total detector surface.

SUMMARY OF THE INVENTION

An object of the present invention is to provide a planar image detector that exhibits an improved ratio of active detector surface to total detector surface.

The object is achieved in accordance with the invention by a planar image detector having a number of photosensor elements arranged as a matrix, the photosensor elements being respectively activated via at least one associated switching element and respectively exhibiting at least one storage element with a predetermined capacity, the storage elements are arranged above and/or below the photosensor elements. The photosensor elements with associated switching element are also usually designated as pixels.

The terms "above" and "below" are defined with regard to the incidence direction of the rays. The radiation striking the planar image detector thus first reaches the storage elements above the photosensor elements, then the photosensor elements themselves and subsequently the storage elements arranged below the photosensor elements.

By the inventive arrangement of the storage elements above and/or below the photosensor elements, a larger sensor area is obtained at each photosensor element given the same pixel pitch (and therewith an overall larger detector surface, so the image quality is correspondingly improved.

The number of the photosensor elements in the active detector surface can alternatively or additionally also be increased by the inventive arrangement of the storage elements above and/or below the photosensor elements.

"Pixel pitch" means spacing; or distance between two adjacent photosensor elements measured from their center points. The smaller the pixel pitch, the sharper the image (generated from the radiation) that the planar image detector supplies.

Because the storage elements are arranged above and/or below the photosensor elements, it is moreover possible to additionally or alternatively reduce the total detector surface of the planar image detector.

The inventive planar image detector is suitable for a number of radiation types. An embodiment of the inventive planar image detector thus is suitable, for example, for detection of x-ray radiation. For this purpose, a radiation converter (which can be fashioned, for example, as a scintillator) is positioned in front of the photosensor elements.

For example, gadolinium sulfide doped with terbium ($Gs_2O_2S$:Tb) is suitable as a scintillator material, as is zinc cadmium sulfide doped with silver (ZnCDS:Ag) or lanthanum oxibromide doped with terbium (LaOBr:Tb) or cesium iodide doped with thallium (CsJ:TI) or cesium iodide doped with sodium (CsJ:Na).

Short signal paths and short signal delays associated therewith are obtained according to an embodiment of the planar image detector wherein the switching elements are arranged adjacent to the photosensor elements.

According to an embodiment of the planar image detector, the photosensor elements are executed as phototransistors and/or the switching elements are executed as switching transistors.

It is advantageous when the phototransistor has a semiconductor layer on which the drain electrode and the source electrode are arranged alternating over the surface. This allows an optimized surface utilization and therewith again improved signals. It is particularly advantageous from a production viewpoint when the drain electrode and the source electrode respectively exhibit a comb structure in plan view.

A planar image detector can be particularly simply manufactured (from a production viewpoint) in which the semiconductor layer of the photosensor element (in particular of the phototransistor) and the semiconductor layer of the switching element (in particular of the switching transistor) are composed of an identical material. If the semiconductor layers are mounted in a common production step, further advantages then result with regard to the manufacturing.

According to a preferred embodiment of the planar image detector, the semiconductor layer of the switching transistor is protected from incident radiation by a light protector element. The switching states of the switching transistors are defined more clearly due to the resulting protection of the radiation-sensitive semiconductor layer. Moreover, the contrast ratio generated by the phototransistors is improved, so a sharper image is generated.

According to a further preferred embodiment of the inventive planar image detector, the phototransistor is fashioned as a thin film transistor (TFT); the semiconductor layer of the thin film transistor is formed of amorphous silicon that is applied in a low-temperature manufacturing process.

According to an advantageous embodiment of the planar image detector, the memory element comprises indium tin oxide (ITO). Since this material is particularly light-permeable, the memory element can be arranged as a large surface over the photosensor element without an impairment of the image quality being connected with this.

According to a further embodiment, the drain electrode and the source electrode can also at least partially comprise indium tin oxide (ITO).

A particularly compact design of the planar image detector is obtained given an embodiment in which the phototransistor and the switching transistor exhibit a common drain electrode.

A planar image detector in which the phototransistor and the gate electrode of the switching transistor comprise an identical material can be manufactured particularly simply from a production point of view. If the phototransistors and the gate electrodes of the switching transistors are applied in a common manufacturing step, further advantages result with regard to the manufacture.

DESCRIPTION OF THE PREFERRED EMBODIMENTS

Figure 1:
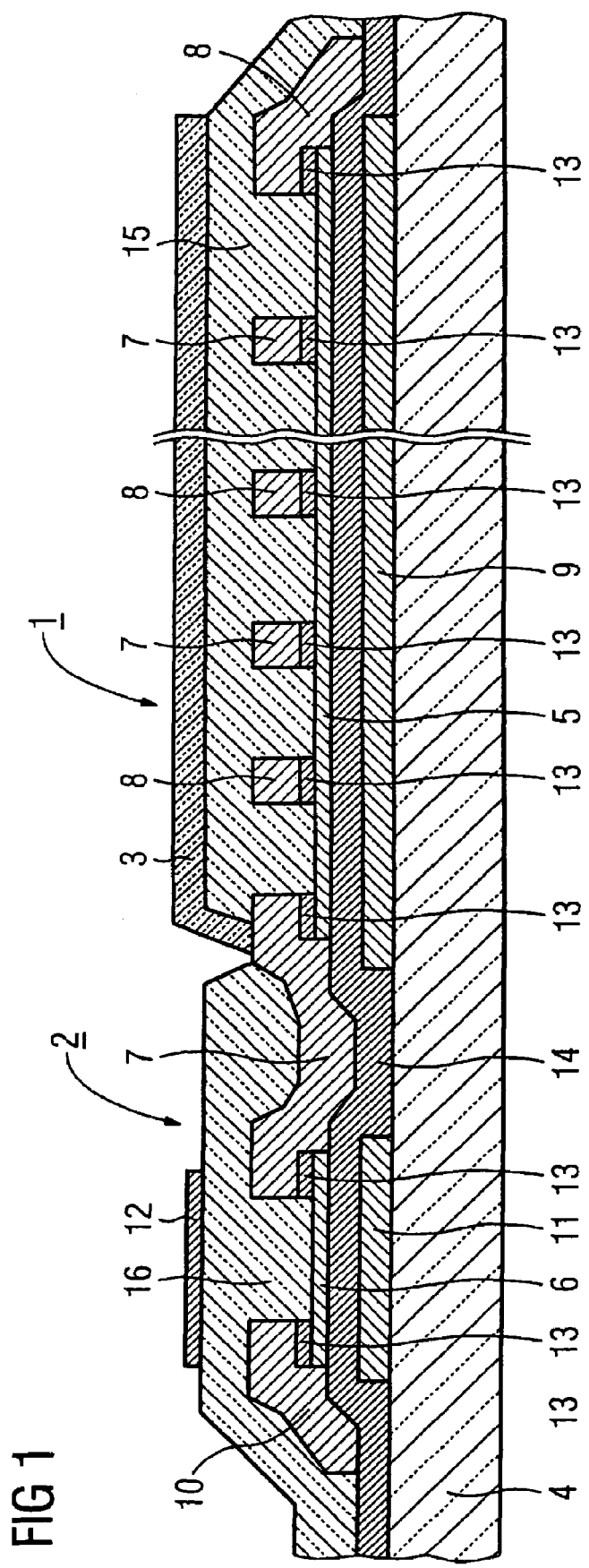
FIG. 1 is a section through a pixel of an inventive planar image detector.
Figure 2:
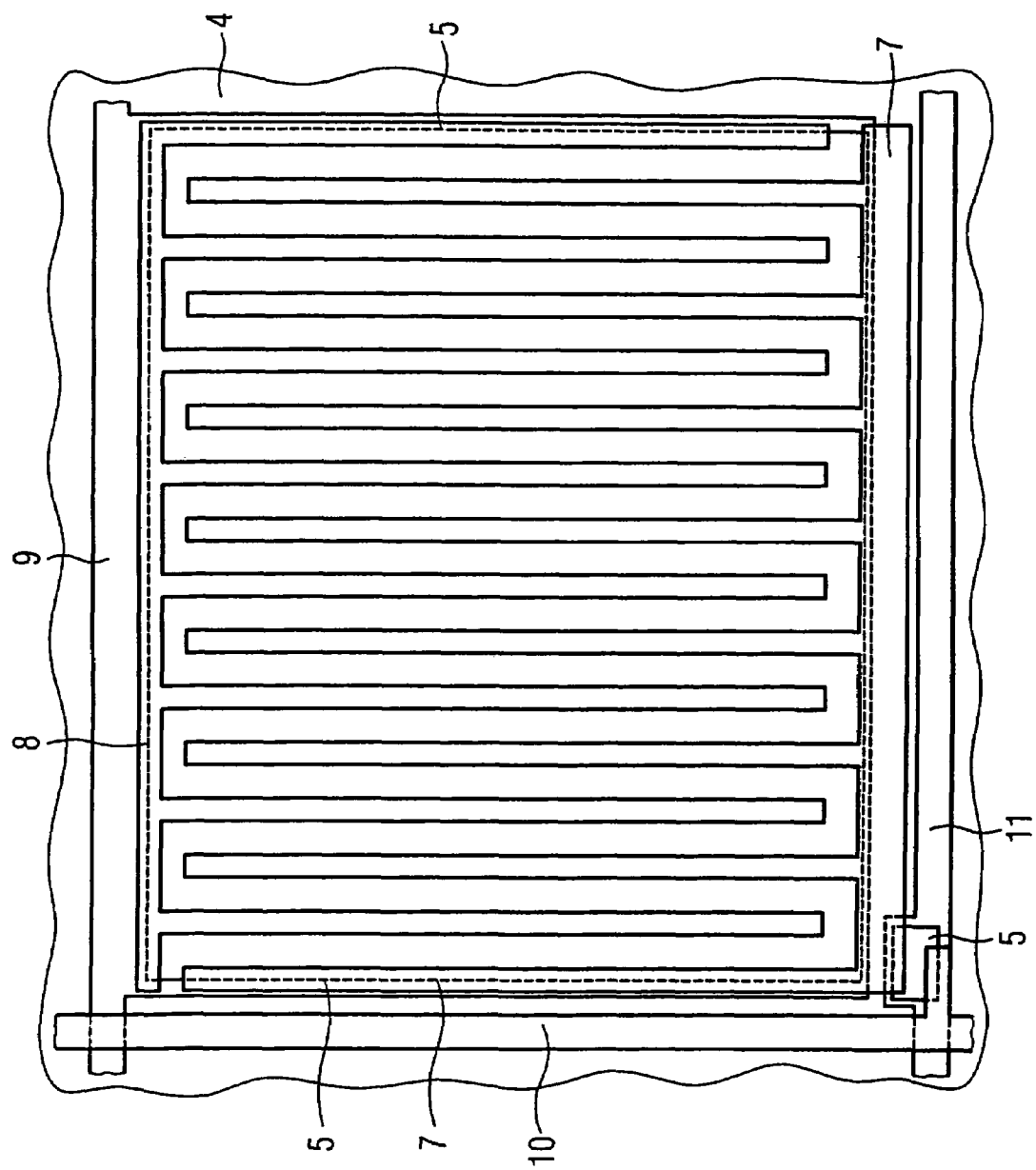
FIG. 2 is a plan view of the pixel according to FIG. 1.

A photosensor element of a planar image detector is designated with 1 in FIGS. 1 and 2. Together with a number of further photosensor elements (which are not shown in FIGS. 1 and 2), the photosensor element 1 forms a planar image detector designed like a matrix.

The photosensor element 1 can be activated via at least one associated switching element 2 and has at least one storage element 3 with a predetermined capacity. The storage element 3 can be arranged above and/or below the photosensor element 1. In the shown exemplary embodiment, a storage element 3 is arranged only above the photosensor element 1.

The term "above" is defined with regard to the incidence direction of the rays. The radiation impinging on the photosensor element 1 thus first reaches the storage element 3 above the photosensor element 1 and then the photosensor element 1 itself.

In the shown exemplary embodiment the photosensor element 1 is fashioned as a phototransistor. In the embodiment according to FIG. 1 the switching element 2 is executed as a switching transistor and arranged adjacent to the phototransistor 1. By this measure short signal paths and correspondingly short signal delays are obtained. The phototransistor 1 and the associated switching transistor 2 are frequently also designated as a pixel.

In the shown exemplary embodiment the phototransistor 1 and the switching transistor 2 are mounted on a substrate 4 made from glass.

The phototransistor 1 is executed as a thin film transistor (TFT) with a semiconductor 5 made of amorphous silicon. The switching transistor 2 is likewise fashioned as a thin film transistor with a semiconductor 6 composed of amorphous silicon.

A drain electrode 7 and a source electrode 8 are arranged alternately over the surface on the semiconductor layer 5 of the phototransistor 1 above an n-doped layer 13. As is clear from FIG. 2, the drain electrode 7 and the source electrode 8 considered in plan view respectively exhibit a comb structure. An optimized area utilization and thus again improved signals are thereby obtained, whereby at the same time the layout is optimized with regard to production. For reasons of clarity, in FIG. 1 fewer elements of the comb-like structures of the drain electrode 7 and the source electrode 8 are shown. The n-doped layer 13 is likewise not shown in FIG. 2 for reasons of clarity.

The phototransistor 1 furthermore comprises a gate electrode 9 that is arranged on the substrate 4.

The switching transistor 2 comprises a source electrode 10 and a drain electrode that is formed by the drain electrode 7 of the phototransistor 1. The phototransistor 1 and the switching transistor 2 thus exhibit a common drain electrode 7. Like the drain electrode 7, the source electrode 10 is applied over the n-doped layer 13 on the semiconductor layer 6. Furthermore, the switching transistor 2 possesses a gate electrode 11 that is likewise arranged on the substrate 4.

By the arrangement of the memory elements above the phototransistor 1, a larger sensor area is obtained at each phototransistor 1 given the same pixel pitch (and therewith an overall larger detector surface given the planar image detector produced from such phototransistors), whereby the image quality is correspondingly improved.

Alternatively or additionally, the number of the phototransistors in the active detector surface can be increased via the provided arrangement of the storage element 3 above the phototransistor 1.

Because the storage element 3 is arranged above the phototransistor 1, it is moreover also possible to additionally or alternatively reduce the total surface requirement of a planar image detector produced from such phototransistors.

In the embodiment shown in the drawing, the storage element 3 is formed of indium tin oxide (ITO). Since this material is particularly light-permeable, the storage element 3 can be arranged as a large surface over the photosensor element without an impairment of the image quality being connected with this. The storage element 3 is not shown in FIG. 2 for clarity.

In the exemplary embodiment shown in the drawing, the semiconductor layer 6 of the switching transistor is protected from incident radiation by a light protector element 12. The switching states of the switching transistor 2 are defined more clearly due to the resulting protection of the radiation-sensitive semiconductor layer 6. Moreover, the contrast ratio generated by the phototransistor 1 is improved, whereby a sharper image is generated. The light protector element 12 is not shown in FIG. 2 for clarity.

The pixel design shown in FIGS. 1 and 2 is protected by a number of passivation layers.

The gate electrodes 9 and 11 are protected by an inorganic passivation layer 14. A part of the common drain electrode 7 as well as the entire source electrode 8 of the phototransistor 1 are surrounded by an organic or inorganic passivation layer 15, whereas the other part of the common drain electrode 7 and the source electrode 10 of the switching transistor 2 is surrounded by an organic or inorganic passivation layer 16 the passivation layers 14, 15 and 16 are not in shown in FIG. 2 for clarity.

Although modifications and changes may be suggested by those skilled in the art, it is the intention of the inventors to embody within the patent warranted hereon all changes and modifications as reasonably and properly come within the scope of their contribution to the art.

We claim as our invention:

1. A planar image detector comprising:
   a plurality of photosensor-elements in a matrix formation;
   a plurality of switching elements respectively associated with the photosensor elements that individually activate the respective photosensor elements; and
   each photosensor element having at least one storage element associated therewith having a predetermined storage capacity, the storage element being disposed above and/or below the associated photosensor element.

2. A planar image detector as claimed in claim 1 wherein said switching elements are disposed adjacent to the respective photosensor elements.

3. A planar image detector as claimed in claim 1 wherein said plurality of photosensor elements is a plurality of photo-transistors and wherein said plurality of switching elements is a plurality of switching transistors.

4. A planar image detector as claimed in claim 3 wherein each photo-transistor and each switching transistor comprises a drain electrode and a source electrode disposed in alternation on a surface of a semiconductor layer.

5. A planar image detector as claimed in claim 4 wherein the drain electrode and the source electrode form a comb structure on said surface of said semiconductor layer.

6. A planar image detector as claimed in claim 3 wherein said photo-transistors are disposed on a surface of a first semiconductor layer and said switching transistors are disposed on a surface of a second semiconductor layer, said first and second semiconductor layers being comprised of the same semiconductor material.

7. A planar image detector as claimed in claim 6 wherein said plurality of photo-transistors and said plurality of switching transistors are mounted in a common production step.

8. A planar image detector as claimed in claim 6 comprising a light protector element disposed over said second semiconductor layer to protect each switching transistor from incident radiation.

9. A planar image detector as claimed in claim 3 wherein each photo-transistor is a thin film transistor.

10. A planar image detector as claimed in claim 9 wherein said thin film transistor comprises an amorphous silicon semiconductor layer.

11. A planar image detector as claimed in claim 3 wherein each photo-transistor and associated switching transistor share a common drain electrode.

12. A planar image detector as claimed in claim 3 wherein each photo-transistor has a gate electrode and each switching transistor has a gate electrode, the respective gate electrodes of each photo-transistor and the switching transistor associated therewith being formed of the same material.

13. A planar image detector as claimed in claim 12 wherein the photo-transistors and the gate electrodes of the switching transistors are mounted in a common production step.

14. A planar image detector as claimed in claim 3 wherein each photo-transistor has a drain electrode and a source electrode and each switching transistor has a drain electrode and a source electrode, each of the drain and source electrodes of the photo-transistors and the drain and source electrodes of the switching transistors being at least partially formed of indium tin oxide.

15. A planar image detector as claimed in claim 1 wherein said storage element is comprised of indium tin oxide.

16. A planar image detector as claimed in claim 1 wherein said plurality of photosensors is a plurality of photo-transistors.

17. A planar image detector as claimed in claim 1 wherein said plurality of switching elements is a plurality of switching transistors.

18. A planar image detector as claimed in claim 1 comprising a radiation converter disposed above said plurality of photosensor elements.

19. A planar image detector as claimed in claim 18 wherein said radiation converter is a scintillator.

20. An x-ray detector as claimed in claim 19 wherein said scintillator is comprised of scintillator material selected from the group consisting of gadolinium sulfide doped with terbium, zinc cambium sulfide doped with silver, lanthanum oxibromide doped with terbium, cesium iodide doped with thallium, and cesium iodide doped with sodium.

* * * * *